Figure 1:
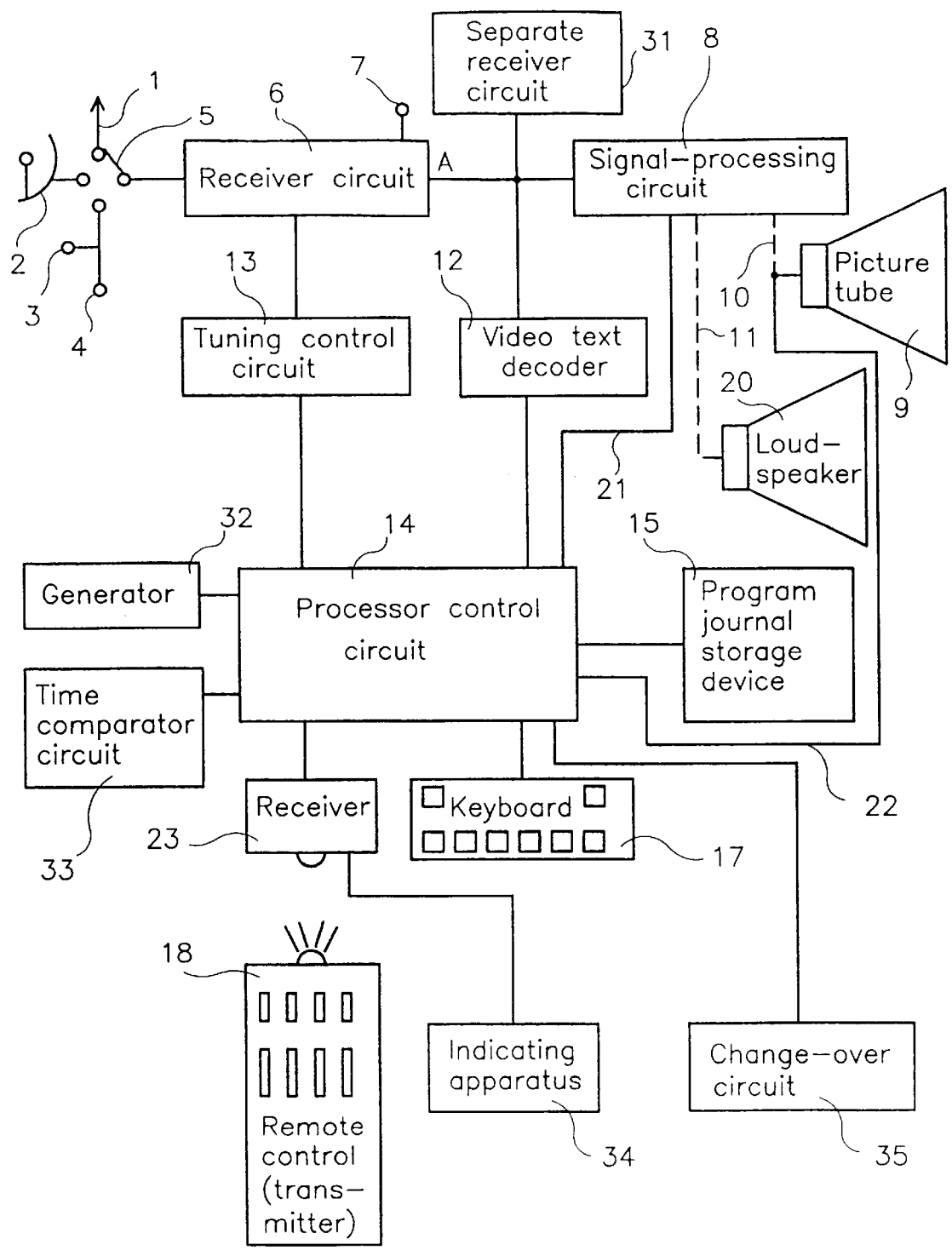

United States Patent

Schaas

[11] Patent Number: 6,091,456
[45] Date of Patent: Jul. 18, 2000

[54] METHOD FOR THE SETTING-UP OF AN ELECTRONIC PROGRAM JOURNAL AND CIRCUIT THEREFOR

[76] Inventor: Gerhard Schaas, Sonnenleite 11, 96472 Rödental, Germany

[21] Appl. No.: 08/718,483
[22] PCT Filed: Mar. 24, 1995
[86] PCT No.: PCT/EP95/01106
  § 371 Date: Sep. 25, 1996
  § 102(e) Date: Sep. 25, 1996
[87] PCT Pub. No.: WO95/26608
  PCT Pub. Date: Oct. 5, 1995

[30] Foreign Application Priority Data

Mar. 26, 1994 [DE] Germany .................. 44 10 547

[51] Int. Cl.[7] .................. H04N 7/00; H04N 11/00
[52] U.S. Cl. .................. 348/460; 348/468; 348/461; 348/462
[58] Field of Search .................. 348/460, 468, 348/461, 462, 476, 473, 477, 478, 570; H04N 7/00, 11/00

[56] References Cited

U.S. PATENT DOCUMENTS

| | | | |
|---|---|---|---|
| 4,751,578 | 6/1988 | Reiter et al. | 358/183 |
| 4,894,714 | 1/1990 | Christis | 358/86 |
| 5,231,493 | 7/1993 | Apitz | 358/146 |
| 5,260,788 | 11/1993 | Takano et al. | 358/142 |

FOREIGN PATENT DOCUMENTS

| | | |
|---|---|---|
| 0460520 | 12/1991 | European Pat. Off. . |
| 3031527 | 1/1987 | Germany . |
| 3527939 | 2/1987 | Germany . |
| 2126002 | 3/1984 | United Kingdom . |

OTHER PUBLICATIONS

Horst Werle: Technik des Rundfunks, Technik der Systeme, Rundfunkversorgung, R.V. Decker's Velag, G.Schenck, Heidelberg 1989, ISBN 3–7685–0389–5 pp. 48–56.

"Rundfunktechnische Mitteilungen", 1983, pp. 116 to 134, "Neue Leistungsmerkmale Für Einen Künftigen Videotextstandart" by Gerhard Möll.

"Rundfunktechnische Mitteilungen", 1985, pp. 161 to 169, "VPS—Ein neues System Zur Beitragsgesteuerten Programmaufzeichnung"by A. Heller.

Primary Examiner—Nathan J. Flynn
Assistant Examiner—Vivek Srivastava
Attorney, Agent, or Firm—Horst M. Kasper

[57] ABSTRACT

The invention relates to a method and a circuit arrangement for producing an electronic program journal. The data of upcoming programs, contained in received television and/or radio signals, are evaluated and are stored and displayed according to specific sorting algorithms. The thus received and sorted data are displayed in the form of an electronic program journal. This data can be called upon for tuning the apparatus based on a simultaneous coordination of the transmitted data, such as channel data or frequency data, to the individual programs.

58 Claims, 2 Drawing Sheets

| Program Journal | | | 23.3. | |
|---|---|---|---|---|
| 01 | BRIII | Music Barn | 20.15 | 21.30 |
| 02 | WDRI | In the Jungle | 20.15 | 21.00 |
| 03 | NRIII | Sea Coast | 20.20 | 21.15 |
| 04 | ARDI | Travel Quiz | 20.20 | 21.50 |

Fig.2

METHOD FOR THE SETTING-UP OF AN ELECTRONIC PROGRAM JOURNAL AND CIRCUIT THEREFOR

The invention concerns a method for the setting-up of an electronic program journal for television and/or sound radio programs in an apparatus for the reception of television arid/or sound radio signals from different transmitting institutions or program carriers for the performance of the method.

Radio journals, from which the individual programs or transmission contributions, which are receivable at the respective location of reception, are evident and namely for the television radio as well as also for the sound radio in script form have been known for a long time. Beyond that, it is known since introduction of the video text system that those transmission institutions, which emit video text pages with their programs also emit program survey pages about programs of the day or programs of the following day up to program information over a longer time span, which can be received, stored and indicated selectively by the receiver which comprises a video text receiver. Different transmission institutions beyond that also send out program surveys of other transmission institutions. Thereby, it is possible for the user always to obtain an updated program indication of the respectively selected transmitter or, in the case that the transmitter also transmits program indications of other transmitters, these likewise indicated on the display of his reception apparatus. Serving as reception apparatus is as a rule a television reception apparatus or a video recorder which is connected to a television reception apparatus so that the large area picture screen of the television reception apparatus can be used for the representation of the program tables. This applies in the case that the video text recorder is incorporated in the television reception apparatus, and equally well for a construction, in which although a video-recording apparatus is present, the indication however takes place by way of the picture screen of the television receiver connected by way of a bus. The video text system, now called television text, is described in the trade journal "Rundfunktechnische Mitteilungen", 1983, pages 116 to 134. Besides that, it is known to undertake a program of the video recorder in dependence on the program surveys transmitted with the video text pages or video text tables in such a manner that the respective program is selected from the program survey table, which for example contains 25 line entries and program data, in order thereby to control the video recorder. The selected program data are filed in a storage device of the video recorder and monitored by the processor of the video recorder so that a time-dependent drive control of the video recorder takes place at the switch-on times and switch-off times associated in the program data (VPV data described in "Rundfunktechnische Mitteilungen", 1986, pages 223 to 229). This method just as also other setting methods, in which the switch-on times and switch-off times are enterable individually, is also possible when beside the video text program data also VPS data, thus data for the program-dependent control, are co-transmitted by the transmitter. When it is entered during the programming that VPS data are concerned or these are already pointed out in the program survey in the video text page, the control of the switched-on video recorder takes place in dependence on the program data which are transmitted in dependence on program so that, independently of the actual switch-on time also in the case of time displacements of the program beginning, a recording of the program takes place at the real time of the radiation of the program and the switching-off likewise takes place under the control of the VPS signal. The method is described in the trade journal "Rundfunktechnische Mitteilungen", 1985, pages 161 to 169.

It is evident that for the preliminary programming, for example for the recording by the video recorder, the user must check over the video text pages of the individual transmitters, which co-transmit these, i.e. he must for a programming switch over to different reception channels in order to undertake the programming. Even when individual transmitters transmit the program surveys from other transmitters likewise by video text program tables, the user remains not spared from initially having to call up all those transmitters, in order to be able to undertake the programming, which likewise make a program preview possible. Beyond that, the user receives no survey over all programs which are radiated planned in a certain time span, for example in the next hour or on the next day or however also within the next week from all transmitters receivable at the location of reception. For this purpose, he resorts in known manner to the program journals which are available in script and picture and in which the programs are listed tabularly associated with the transmitters. In order to be able to tune his reception apparatus to the corresponding terrestial or satellite transmitters or transmitters received by way of cable channels, he must set the channel number or, in the case of the use of sound radio transmissions, the frequencies in the apparatus in order to be able to receive the corresponding program which he wants to see or hear. The programming by means of coded data according to the Viewshow method by take-over of the code numbers from a program journal is likewise possible.

A method for the alpha-numeric station indication at the receivers for high-frequency electrical oscillations is known from the DE 30 31 527 C2, according to which method tables; with a power identification and a transmitter location number are filed in further non-volatile storage devices according to the geographic distribution of the transmitter location and associated with the tables for the transmitter names, special programs and transmission frequencies. These transmitting tables are compared on the basis of the received frequencies and the comparison with the filed identification data corresponding to the location numbers in the receiver and the table data are brought alpha-numerically to indication. The transmission contributions, which in the sense of the present invention are denoted as programs, are in that case not indicated in detail, but only the short notation of the transmitter and the location of the transmitter as well as, in a given case, the transmitter location number, power identification and frequency.

Starting out from this state of the art, the invention is based on the object of indicating a novel program journal, namely in the form of an electronic journal, and a method for the setting-up of the same, which permits the user to obtain all programs which are available and/or receivable at the location during certain time portions illustrated in easily surveyable form on the picture screen itself irrespective of the transmitter, from which they are present, in order based thereon to be able to undertake a selection of the corresponding transmitter either in conventional manner or however directly with utilisation of the stored program data.

The invention solves the problem by the method indicated in claim 1 as well as by a circuit, which is indicated in claim 31, for the performance of the method.

The partial problem of the direct selection of the program by reference to the program data is achieved in development of the method according to the invention according to claim 1 or 2 by the method according to claim 3 as well as by the circuit according to claim 31.

Advantageous method steps are indicated in detail in the claims 2 to 30. Circuits for the performance of the method are furthermore indicated in the claims 32 to 55. The methods and circuit constructions indicated in the claims and advantageous developments of the circuit constructions are referred to.

The method according to the invention permits an electronic program journal to be produced and updated in the reception apparatus and thereby to afford the user the possibility to inform himself about the actual program offer of the transmitting institutions, wherein the program offers, which are set up from the video text pages or other program information program data and associated with the transmitting institutions, can be ordered according to different criteria. The simplest criterion is the listing of the presently receivable programs of the individual transmitting institutions. A further criterion can be the calling-up of programs which are offered in the next hour and namely from all transmitters which are receivable at the reception location without in that case having to switch over from one channel to another in order to have to evaluate video text pages, for example in the case of television transmissions, visually or have to wait for such program survey tables. The user thus always automatically obtains an updated survey of the program offers. The listing can be updated according to scope of the program journal storage device also to the survey of a weekly program or even over a monthly time span or longer. This always depends on the extent to which the program data are radiated in time dependence by the transmitting institutions. This applies equally well also for program data which are co-transmitted in sound radio and contain advance data for programs. For the radiation data transmitted with the program data, namely day and clock time for start and end, such data can of course also be used for the recording control. The same applies also for the taking-over of VPS or RDS data for recording or presentation control of the apparatus. Program contents can also serve as further indicating criteria in so far as the corresponding identifications are co-transmitted, for example whether a music transmission, a science transmission, a sports transmission, an entertainment program, a news program or the like is concerned. The corresponding identifications are agreed for the television broadcasting as well as also for the sound broadcasting and are partially transmitted already now by the transmitting institutions. In this manner, it is possible by reference to the received program data to effect such an association with certain criteria by a program control. Beyond that, the invention however also makes a freely selective association possible in that, for example, "music transmission" is entered by way of the operating keyboard. The computer program, which is to be designed appropriately, in that case puts together all programs, which are listed in the program journal, according to these criteria, which can take place before the storage or during the reading-out of the data from the program journal storage device insofar as these are characterised and/or can be selected, for example, as music transmission. The list of the sorting criteria lets itself be extended as desired. The indicated criteria are to be regarded here only by way of example as one possibility. It is in that case self-evident that the sorting program, which must be implemented in the process control, always does justice to these demands.

The invention beyond that for the first time indicates a completely new tuning system, in which the tuning namely no longer takes place to a certain channel as known according to the state of the art, but can take place in dependence on the program selection. Standing for program here is the respective individual transmission contribution limited in time. The user selects only the program which he wants to see or hear. This is switched on as soon as the program is transmitted. In the other case, the presetting is registered and the program is switched-to automatically at the switching-on instant in the program data. A latching circuit can be provided in that case, so that a switching-over to a preset program does not take place when a current program is viewed. When however a transmission is concerned, which is to be presented or recorded with priority, then also a current presentation or recording is interrupted and the program data provided with priority are drawn on for tuning and the corresponding program is presented or recorded. Beyond that, the invention however also offers a simple child protection in the manner that programs, which are for example liable to corrupt the young, can be blocked in simple manner. The user can thus already in advance over a certain time span mark all programs which are for example not to be seen by his children. The marking of these programs in the presentation has the effect that a tuning to these programs is not possible for anyone not knowing the blocking code. Only the user, who enters the blocking code or the necessary cancelling code, can cause the switching-free of the marked programs. The blocking can take place block by block, thus by collecting together several programs, or however also in respect of each individual program which is to be recorded or presented next in the sequence. It is self-evident that an apparatus, which fulfills all these functions according to the individual method steps, must be provided with a processor control which displays the required computing and storage performance. It is in that case likewise self-evident that the programs of the processor control are in that case to be so developed that the respective functions, which are indicated in the method steps, can be realised.

A circuit for the realisation of the method always requires in every case that the received and decoded data are checked for whether program data are concerned in that case, which are either derived from video text pages or radiated by the transmitter as individual data in preview of a future transmission. This applies also for such program data which contain television programs or sound radio programs. The method according to the invention and the circuit arrangement for the evaluation are the same in both cases. In the case that the program carrier is a CD disc player, for example a multiple disc storage device, the recording data, which are put in front of the individual recorded pieces or films or the programs at the beginning of the individual CD's, are to be regarded as program data and listed in the same manner so that a continuous selection of recorded picture or sound data is possible by means of the program journal also by way of this. In the case of the CD disc player, no tuning circuit is controlled in that case, but—in dependence on the program data, the disc and the track is selected by the running mechanism, which corresponds to this program information.

In the case that, apart from the short notations of the individual programs, also detailed program descriptions are received and stored, the program data at the same time also serve to enable those addresses of the storage device to be called up, in which the augmenting explanations are stored so that the user can inform himself graphically about the program content of the respective offer, for example a television show or a film or a piece of music, before he makes a selection in order to let the program concerned be presented or recorded. This, too, is possible by way of the electronic program journal.

The invention is explained more closely in the following with the aid of an example of embodiment of a receiver according to FIG. 1 and a possible representation of an electronic program journal on the picture screen of a television apparatus in FIG. 2.

In the block schematic diagram in FIG. 1, a receiver is illustrated schematically with an evaluating circuit which embodies the circuit arrangement for the performance of the method. In the block schematic diagram, an area for the reception of terrestial television and/or sound radio signals is represented by the reference symbol 1, a satellite reception plant by the reference symbol 2, a connection to a cable distribution network by the reference symbol 3 and a feeding-in of programs from a mass program storage device, for example a music computer with a plurality of CD's, the tapped-off signals of which are transmitted modulated by a carrier, by connection 4. The individual connections are couplable by way of a selector switch 5 to the receiver circuit 6. The receiver circuit 6 consists of a tuner which is tunable to the respective transmission frequencies and an intermediate-frequency amplifier as well as a demodulator. The demodulated signal, which is fed to the further signal-processing stages 8 in the apparatus, is present at the output A. In the case that a television reception apparatus is concerned in that case, this is the picture and sound signal-processing circuit which by way of the outputs 10 and 11, which are drawn in dashed lines, is fed to the picture tube 9 and the loudspeaker 20, respectively. The signal-influencing in that case takes place by the processor control unit 14 by way of the control line 21 in dependence on entered function-setting values which can be entered on the one hand by the local keyboard 17 at the apparatus itself and on the other hand by the remote control transmitter.

In the case that an apparatus for the reception of radio signals, for example RDS signals or DSR signals or Musicam signals, is concerned, the signal-processing circuit 8 consists exclusively of sound signal-processing stages, for which the sound is radiated by way of several loudspeakers 20. The possibilities of the: recording of the received signals is not illustrated here for the sake of simplicity. A radio receiver equipped with the evaluating circuit comprises either a larger display, for example a flat display, or a small picture tube in the apparatus or a connection for a television-receiving apparatus, on the picture screen of which the data are indicated, which are assembled by the method according to the invention. For this reason, the line 10 is illustrated in dashed lines, whilst the line 22 is illustrated as continuous line. The evaluating circuit according to the invention in the example of embodiment comprises a video text decoder 12 or a decoder which selects the program data from the offered data packets. When television signals are concerned, these are video text pages which in the case of digital transmission of television signals can likewise be transmitted in the service channel just as in addition to the video and sound signals in the case of the signal transmission according to present standards. When thereagainst a pure radio receiver is concerned, the derived program data can be RDS data or other program data which are offered for a previewing program indication. The decoder 12, which filters out these data and translates them by means of an own processor into reproducible symbols, stores the pages or individual program data in a separate own storage device and namely as they are offered. The processor control 14 by way of the tuning control circuit 13 causes a tuning to all transmitters receivable at the place of installation. This takes place, for example on the switching-on of the apparatus, by a search run, in which all receivable transmitters are ascertained. This process can be repeated discontinuously for the regeneration of the data in the storage device of the video text or RAM-data receiver 12 or however be managed on the changing-over from one channel to the other or on the switching-off of the apparatus. In every case, the information pages containing the program data are also received during the tuning and taken over by the video text decoder. The taking-over can also be initiated by actuation of a special take-over key at the remote control transmitter 18 or the local control 17. Beyond that, the processor control circuit by reason of a further inscribed program undertakes a new ordering of the program data which are received by the transmitters and orders these according to quite definite preset criteria. This criterion can for example be that all programs, thus transmission contributions of a certain transmitter, for example ARDI and RTL, are represented in ordered manner for a week or a day or a month. It is however initially expedient that the processor control puts the program data ordered in lists according to clock times one alongside the other by the inscribed program so that the user can immediately see at which clock times and at which day which programs are radiated by which transmitters. The length of the list and the contents of the list in that case depend on the respective program data which are offered as preliminary information by the individual transmitters over a certain time span. When such a list is set up, the program data are stored in a program journal storage device 15. These data are constantly regenerated, as already indicated previously, in that the new program data for the preliminary information are by discontinuous or continuous search runs initially decoded by the decoder 12 and filed and the processor control circuit 14 according to the entered program takes these data over as new data or writes over present data in the storage device 15 or, in the case that the data are identical, does not undertake any overwriting. Associated with the data are of course also the switching-on instants and in a given case also the switching-off instants as well as, in the case of data which come from the video text system, the VPS data in order therewith to switch on and/or off the connected apparatus or the apparatus itself or the recording in dependence on the VPS data. This evaluating circuit, as discussed here, can of course also be used in video recorders in completely identical mode of construction. In this case, the connected television apparatus with a picture tube 9 serves as visual display unit.

When the list of the program contributions is set up in the discussed mode and manner, the computer program can also monitor which program data are out of date, i.e. the corresponding programs are no longer present due to lapse of time. The list thus leads to constantly updated program references. For this reason, it is also clear that the program journal is always updated as electronic journal and, in the case of resetting of the program sequences or the transmitted items at short notice, the user can also get an overall view concerning this, which is not possible for him by reference to printed program journals appearing weekly, since the program journals are printed and dispatched already one and a half weeks before the beginning of a transmission. A subsequent updating is possible with the electronic program journal. If still further textual or pictorial substantiations exist for the individual program indications, these are to be filed in a separate storage device. In the case of call-up of an information key on the operating field 17 or the remote control 18, the program data serve as address data for the calling-up of the augmenting filed program descriptions which are then likewise indicated on the picture screen of the picture tube 9. Beyond that, the invention however also provides that, according to another control program, the processor control circuit undertakes a resorting of the data in the program journal storage device 15 through appropriate input command by way of a key of the remote control transmitter 18 or the local control 17 in such a manner that, for example, all program contributions of the Bavarian radio BRI of one week, one day or one month are indicated. Other ordering criteria can likewise be entered, for example the selection of pure music transmission, the selection of news transmissions and so forth. The corresponding selection criteria are adaptable through the computer program in accordance with the habits of the user. For the purpose of the selected drive control, the remote control commands received by the remote control transmitter 18 are prepared by the receiver 23 and fed to the processor control circuit 14.

It is evident that the indicated evaluating circuit represents a self-contained unit which can be deployed in different items of entertainment-electronics apparatus, for example in a television reception apparatus which already makes the display available as large display and in which video text pages are representable by 20 or 25 lines in known manner. This unit can however also be provided in a video recorder. The data are then indicated either on an own display of the apparatus or however also on a connected television receiver which serves for the reproduction of the recorded transmissions. In the case of such receivers, the processor control unit 14 as beyond that not only a program for the regeneration of the program data in the storage device 15, but also ascertains the associated frequencies for the individual transmitters or channels which are stored as belonging to the individual program data so that a completely new tuning system is likewise realised by the invention in that namely no longer channels are tuned to, but that the user can with the aid of the program journal preset the program or switch over from the currently running program to another one, which meets his wishes, without first having to get himself an overview about the actual programs by channel-skipping or having to call up the program survey tables of a certain transmitter in order to see which transmission is just being radiated by this transmitter or which program is just being received.

The electronic program journal thus makes it possible that through selection of the individual program lines, which can be effected for example by the prefixed serial numbers or by a cursor control, the tuning of the receiver circuit takes place to the respective transmitter in that a cursor movement is achieved by means of the remote control transmitter and the line respectively marked by the cursor is taken over, whereby the receiver is tuned to the channel or the frequency associated with the program. The program data, the switch-on data or explanatory program data or the Prefixed number can of course be filed to be concealed so that a switching-on is also possible in that only one program line is called up, in which the program data or parts of the program data, for example the description of the program, are indicated. Although the necessary control data are thereby also called up automatically, they are however not brought to indication. No limit is set here to the corresponding user control. The quantity of data represented depends merely on the possibility of representation on the picture screen.

In FIG. 2, a partial detail of a page of an electronic program journal is illustrated by way of example, which is also imaged on the picture screen, for example of a television receiver. It is evident from the illustration that Bavarian radio third program is indicated by the serial number 01 in the first line. The program contribution or the program itself displays "music barn" in the title. The start of this transmission is 20.15 and it ends according to plan about 21.30. Beyond that, the data is indicated in the upper corner field of the picture screen 19. In the case of the sorting criterion selected here, all transmissions of one hour are indicated, for which the clock times are indicated as start times in the present case. The corresponding program from WDRI is indicated with the serial order number 02, that of NRIII in the line 3 and that of ARDI in the line 4. It is evident from this that in the case that the user for example wants to see the "Sea Coast" transmission, need enter only the short notation 03 and the corresponding program is already selected. He does not need to know in that case whether the NRIII is stored on storage place 3 or 25 of his tuning storage device in the tuning equipment 13. The system automatically undertakes this association. The same applies also to the transmission "Travel Quiz" when this is called up. The calling-up itself can take place through the serial number entry or however also through cursor control in that the remote control transmitter 18 is so constructed that switching is done forth from one representation line to the next representation line when an appropriate function set is actuated on the remote control transmitter. Through entry of a further control command, corresponding program data are taken over and, in case the preset time agrees with the actual time or the current transmission is running, the program is automatically switched on. For that reason, a sorting program can also be provided, which indicates only the current transmissions and for example still indicates still remaining running times or however also already lapsed times and remaining times in order to give information to the user about whether it is still worthwhile to view the current transmission to the end or not. All these selection criteria can be called up by way of a user control, for example from a criteria catalogue. The data filed in the storage device 15 according to FIG. 1 are then immediately brought ordered to indication. It is also possible that a storage-changing takes place in the storage device itself. It is however more expedient so to structure the software that the reorganisation takes place by way of an intermediate storage device which prepares the data from the storage device 15 for selective representation according to the selection criteria. Thus, it is possible simply again to resort to a clearly viewable program journal which is filed in the storage device 15, the program journal storage device, according to a certain ordering system.

The present invention is not restricted only to high-frequency-received information about program offers of a certain time portion. The invention is usable for example also in connection with a music computer with a plurality of LCD's in order to provide the user with an overview of the individual programs or recorded music films or also feature films in order that he can make a selection from what is offered. The individual data, which are associated with the program, are filed in like manner as in the program journal overview and namely in the storage device 15. The data, when they are riot modulated by a high-frequency carrier, can be fed directly into the signal-processing circuits behind the demodulator. For this purpose, the connection 7 is illustrated symbolically in FIG. 1.

What is claimed is:
1. A method for the setting-up of an electronic program journal for television and/or sound radio programs in an apparatus for the reception of television and/or sound radio from different transmitting institutions, which emit program information as program data in video text (television text)

program survey pages of the own transmitting institution and/or other transmitting institutions or feed these into cable networks and/or send program information as preliminary information to sound radio transmission stations or feed these into cable networks and tuning of the receiver circuit of the apparatus, the following features:

a) decoding the received program data of the video text (television text) pages or the preliminary program information received with the sound radio signals by a decoder and listing tabularly, stored in a program journal storage device and indicated on a display, b) evaluating at least one received identification characterizing the respective program and taking up in the list in association with the program data, c) sorting all received program data according to certain preset filing criteria by a processor circuit with an inscribed program according to a preset ordering algorithm and storing in the program journal storage device either automatically or after actuation of a take-over key, d) automatically associating data of the reception channel or the reception frequency of the transmitter which are necessary for the tuning of the receiver circuit to the program contribution, in the program journal storage device and seizing and storing together with the program data, e) wherein the seizing of tuning data takes place in dependence on the selective tuning of the receiving apparatus to the corresponding channel or the corresponding frequency, f) wherein the tuning data are indicated or concealed, g) calling up the stored program data out of the program journal storage device by actuation of a call-up device and represented on the display page by page according to preset sorting criteria which can differ from the filing criteria, and h) selecting a line of the representation of the data for the tuning of the apparatus to a transmitter, for which the associated data of the reception channel or of the frequency are led to the tuning circuit of the receiver circuit.

2. The method according to claim 1, comprising the following method steps:

a) checking the video text pages (television text pages) or the program information pages radiated by a transmitter in respect of contained program tables or program information data;

b) taking over program data indicated in program information data or tables into video text pages if the program information data or tables are ascertained;

c) inserting program data, which have not yet been entered into storage, according to an ordering algorithm and, writing over or suppressing the program data already entered into storage;

d) examining the video text pages (television text pages) or the program information in the case of sound radio transmissions of the further receivable transmitters in like manner by selective tuning and ordering the program data taken over into the video text pages according to method step (b) and likewise stored in the program journal storage device;

e) wherein the listwise seizing of the program data takes place over a certain time span by reference to the transmission date statements (calender day, check time) associated with the program data, for example over a time span of one week.

3. The method according to claim 1, further comprising setting serial numbers in the display line of a program or characterizing identifications in the represented program data at the front or rear in the program lines.

4. The method according to claim 3, characterized in that the tuning of the apparatus for the reception of a program selected from the electronic program journal takes place through input of the serial number associated with the program or of the identification or, in the case of a cursor control, by selective driving of the program line of the cursor and by way of issue of a take-over command by key pressure of a take-over equipment and that the program is received at the time which is indicated as transmission time and, in the case that the selected program is already being transmitted, this is automatically presented or reproduced at once, wherein the program journal in the case of television reception is not shown in the case of representation on the same display or the indication is not shown only by actuation of a command key.

5. The method according to claim 4, characterized in that additional switch-on data, which is indicated on the picture screen marked for example by "preselection" or by marking or colored backing of the program lines, are preset for the program data which have been selected for a reception.

6. The method according to claim 5, characterized in that the preset data are priority data which are associated with the program data by actuation of a priority-setting equipment and that, in the case of program overlap or reception of a current transmission, the receiver is switched over or on in the tuning circuit in dependence on the priority date to the transmitter, by way of which the program with priority is radiated.

7. The method according to claim 5, characterized in that the processor control equipment for the selection copies the program data selected by presetting or the switch-on data, which are provided with priority data, into a further storage device, or calls the switch-on data or the priority data, which are associated with the program data, from the program journal storage device and compares them with actual time data and, in the case of agreement of the switch-on data with the actual time data, undertakes the tuning to the selected program or initiates this in the tuning circuit.

8. The method according to claim 1, characterized in that the program data are associated with data for the program-dependent control (VPS-control or RDS-control), which are visibly indicated or stored in concealed manner, and that the receiver—with the use of only one receiving circuit during the current reception of a transmission or in the switched-off state of the reproduction equipment—continuously monitors the transmitter in respect of VPS-signals or RDS-signals at least during a certain time window before the expected program start, and wherein the receiver switches over to the program characterized by the program-dependent control or switches on the reception thereof when the switching-on point is signalled by the received data.

9. The method according to claim 8, characterized in that two receiver circuits are selectively driven by a processor circuit or by several processor circuits, wherein the second receiver circuit serves for the monitoring of the program-dependent control (VPS, RDS).

10. The method according to claim 1, characterized in that in the case of use in a television receiver apparatus or sound radio apparatus, the respectively offered transmission is terminated by selection of another program from the program journal or by switching over to another transmitter under time control by the indicated end of transmission or in dependence on the program-dependent control data of the VPS-system or RDS-system.

11. The method according to claim 1, characterized in that program data stored in the program journal storage device by the processor control are erased automatically when the end of the program is no longer receivable due to elapse of time or due to program-dependent identification.

12. The method according to claim 1, characterized in that the video text pages (television text pages) are substituted by data of the service channel in the case of digital transmission of television signals and the take-over of the program data into the program journal storage device takes place in like manner according to the indicated method.

13. The method according to claim 1, characterized in that data allowing locking are addable in addition to each program line and the data indicated therein and that the program line is displayed due to prefixed or inserted or added identifications or due to corresponding marking or colored backing or input of a signal allowing locking by actuation of an input equipment delivering a locking signal and that the locking is cancellable only by an access key known to the authorized user.

14. The method according to claim 13, characterized in that the blocked programs are indicated by means of cursor control and load key by colored identification or other identifying marks and that the apparatus, in the case of a program being blocked, blocks a switching-on of the program or skips the program at the set clock time.

15. The method according to claim 1, characterized in that the data in the program journal storage device, reaching the display, or all data including the concealed ones, are output by way of a printer interface of the apparatus to a printer upon input of a printer control command by way of the processor control equipment.

16. The method according to claim 1, characterized in that the program data in the program journal storage device are subjected to a certain selection ordering according to freely selectable criteria by appropriate inputs by way of a keyboard or by user control on the picture screen and the ordered data are brought to display according to the selected ordering program.

17. The method according to claim 1 characterized in that the data in the program journal storage device are transmitted by way of an interface connectable to a computer by input of a transfer command, which computer is internal of the apparatus or external and which manages longer lists of program data over longer time spans and corresponds with the processor of the processor control in the apparatus in such a manner that the program data stored in the program journal storage device are updated.

18. The method according to claim 1, characterized in that the program journal storage device is a storage device which is connectable to the apparatus, which storage device is also connectable to any apparatus with the same interface for the programming of the other apparatus, wherein the data in the program journal storage device, that are overwritable, are updated in the other apparatus, or this program journal storage device can be blocked against overwriting by new data.

19. The method according to claim 1, characterized in that the data in the program journal storage device are refreshed cyclically at least once a day or refreshed constantly and that newly added new data, taken over from the video text pages or program information pages, are added and existing data are not renewed or overwritten.

20. The method according to claim 1, characterized in that the data in the program journal storage device are refreshed, renewed or added upon the switching-off of the apparatus or upon the switching-over of the apparatus from the normal operating state into the stand-by operation or in stand-by operation and that the apparatus is switched off with delay or switched over with delay into the stand-by operation during the updating of the data in the program journal storage device, wherein the delay corresponds to the required evaluating time for the updating of the program data or that a refreshing of the data takes place constantly during the stand-by operation.

21. The method according to claim 20, characterized in that at least those circuit components of the apparatus required for refreshing the data remain functioning when the indicating display is switched off.

22. The method according to claim 1, characterized in that the data from the program journal storage device are placed into a current television picture represented on the display or shown in a selected partial region of the display.

23. The method according to claim 1, further comprising sorting the program data from the program journal storage device by calling up a certain sorting program;

bringing out the sorted program data of the program journal storage device in such a manner that programs are displayed, which programs are running at the time of calling-up or which programs are receivable in a next hour window or in the day window.

24. The method according to claim 1, characterized in that the program data are ordered additionally according to program kinds and/or program contents and are callable up in ordered manner and displayed upon call-up of the program data according to program kinds and program contents, such as sports programs, science programs, music programs, entertainment programs and news programs as well as according to other program-ordering criteria.

25. The method according to claim 1, characterized in that the program data in the program journal storage device are addresses for the calling-up of detailed program representations which are stored in another storage device and that the detailed program representations can be called up by initiation of a sheet-turning function.

26. The method according to claim 20, characterized in that programs, which are ordered according to thematic fields, are blocked for the reception by the input of blocking signals and released by input of a cancellation signal.

27. The method according to claim 1, characterized in that the apparatus queries all receivable transmitters for program data and the processor control undertakes an updating of the program data in the program journal storage device upon switching the apparatus from the off-state into the stand-by operation or into the normal operating state.

28. The method according to claim 1, characterized in that the program data contain at least the following codings or at least some thereof, which are storable altogether or selectively in the program journal storage device:

Description of the program, kind of the program, transmitting institution (short name), abbreviated description of the transmitter, e.g. BR1, VPS-activation (yes/no), RDS-activation (yes/no), program starting times, program end times, program classification data (music, entertainment, news), radio activation data in order to control the recording or reproduction when correspondingly coded transmissions are involved in dependence on identification signals which are transmitted together with the sound radio transmission, and program description data.

29. The method according to claim 1, characterized in that it is combined with methods of conventional program selection in an apparatus in such a manner that either the conventional program selection or the program selection or the display of the program as set forth previously is drawn upon for the operation of the apparatus.

30. The method according to claim 1, characterized by the use in television reception apparatus or in combined radio and television apparatus or in picture and/or sound recording apparatus in any apparatus for the reception of analogously and digitally transmitted transmissions in mobile or stationary construction, or in conjunction with peripheral apparatuses such as a CD-player, which peripheral apparatuses contain a plurality of stored programs.

31. The method according to claim 1, characterized in that the program data are stored on a CD and can be called up therefrom, that they are listed in the form of a program journal and that the program data stored in the program journal storage device are issued to the indication by way of the processor control, wherein the in di cation as display is component of the apparatus or a connected indicating apparatus.

32. A circuit arrangement comprising:
a receiving apparatus including:
a receiver circuit (6) with a tuner,
an intermediate frequency amplifier and demodulator,
a video text decoder (12) or a decoder for program information, which is transmitted by sound radio, of programs broadcast in a specific future time portion;
a first storage device for storing program data contained in transmitted pages;
a program journal storage device;
a processor control with a microprocessor, wherein the microprocessor reads the program data out of the first storage device according to an inscribed program and stores this program data in the program journal storage device (15) in the form of lists according to a preset ordering algorithm so that said program data can be called up;
a display apparatus having a control;
a local control including setting elements, wherein the program data stored in the program journal storage device (15) are output page by page to the control of the display apparatus corresponding to display possibilities on the display apparatus (9) by input of a display command by actuation of the corresponding setting elements at the local control (17) at the receiving apparatus or of a remote control (18), wherein the display apparatus (9) indicates the program data presented as program information page by page;
a selecting equipment provided for selecting a program line, wherein the receiver circuit of the receiving apparatus automatically receives the channel data or the frequency data for tuning a reception after selection of the program data.

33. The circuit arrangement according to claim 32, characterized in that the display is a component of the apparatus or a component of a display device connected to an apparatus with performing circuit arrangement, which apparatus undertakes the evaluation.

34. The circuit arrangement according to claim 33, characterized in that the performing circuit arrangement is component of a video recorder, with which a television receiver or monitor is connected, and displays the program data, which are stored in the program journal storage device and receivable by way of a bus, on the picture screen or a display.

35. The circuit arrangement according to claim 33, characterized in that the performing circuit arrangement is a component of a television receiver or video recorder for the reception of VPS-signals or of a radio receiver for the reception of RDS-signals or other program data broadcast with the program by a transmitting institution and that the display is present in the radio receiver or has a connection to a television apparatus, wherein the program journal can be displayed on the picture screen of the television apparatus.

36. The circuit arrangement according to claim 34, characterized in that a bidirectional bus is connected between the display apparatus and the evaluating apparatus, wherein commands from the display apparatus or from a remote control for the control of the processor control are input in the evaluating apparatus in order to control a display of the program data according to specific selection criteria or for the selection of program data for the reproduction or recording.

37. The circuit arrangement according to claim 32, characterized in that additional function keys or setting members are present in the operating field of the evaluating apparatus or on the remote control transmitter and that, upon actuation of the additional function keys or setting members, the data in the program journal storage device are brought to display according to specific evaluation criteria as a function of specific programs input into the processor of the processor control.

38. The circuit arrangement according to claim 32, characterized in that the processor control controls a tuning circuit for an automatic search run and stores the transmitters, which have been ascertained in the automatic search run, with the program data, which have been obtained upon reception of these transmitters and are associated with the transmitter or unrelated transmitters, but radiated by the same transmitting institution, or the processor control stores the address for access to the tuning storage device, under which the found transmitter can be called up, wherein the processor program does not allocate the program data of the unrelated transmitters to the tuning data.

39. The circuit arrangement according to claim 38, characterized in that a storage device with a transmitter table is contained in the tuning circuit and that the processor control undertakes an allocation to the transmitters based on the received program data and stores the program data accordingly in the program journal storage device in association with the corresponding transmitting institution.

40. The circuit arrangement according to claim 32, characterized in that the current numbers are input with the input keyboard into the program journal, which is indicated on the display, and the receiver circuit tunes to the selected transmitter based on the take-over of the program data and switches the program on or records the program either simultaneously or, in the case of a presetting, at the moment of the switching-on time associated with the program data.

41. The circuit arrangement according to claim 32, characterized in that the receiver circuit comprises a VPS-decoder and that the processor circuit associates the VPS-data with the program data and that the processor circuit switches the apparatus synchronously, or also the reception circuit during a defined time window, to a waiting position depending on the VPS-data and that the switching to program reception or the switching to the recording takes place only when a switch-on signal for the VPS-coded transmission is applied.

42. The circuit arrangement according to claim 32, characterized in that the processor control of a program evaluates the indicated transmission time in the program journal and in dependence thereon performs the control of the tuning circuit to the transmitter, from which the program is receivable.

43. The circuit arrangement according to claim 32 in conjunction with a television reception apparatus, characterized in that a control circuit automatically initiates the fading out of the program journal on the display and displays the received picture information of a current program upon the switching-on of the current program.

44. The circuit arrangement according to claim 32, characterized in that the display is a color display and that preset program data for a reproduction or a recording are stored in terms of color during the selection by a selection command or a priority command, wherein the preselection or the priority are stored with different colors or the written image representation of the program appears in other colors and that the color recognition is also stored in an evaluatable way in the program journal storage device as additional data.

45. The circuit arrangement according to claim 32, characterized in that the evaluating circuit comprises a separate receiver circuit and that the separate receiver circuit is provided for the reception of current transmissions or for the reception of transmitters tuned by way of the program selections.

46. The circuit arrangement according to claim 32, characterized in that a time comparator circuit, in which the actual time is compared with the preset switching-on time and/or switching-off time, is provided in the apparatus and that the representation or recording of the program is switched on and/or off in dependence on the switching-on times and/or switching-off times associated with the program data.

47. The circuit arrangement according to claim 32, characterized in that the receiver circuit comprises a demodulator for digitally transmitted data and that the data transmitted in the service channel are evaluated by the processor control to the extent that they contain program data.

48. The circuit arrangement according to claim 32, characterized in that the receiver circuit is such as for the reception of signals which are offered terrestrially distributed by way of satellite or by way of channels.

49. The circuit arrangement according to claim 32, characterized in that the apparatus comprises a printer interface.

50. The circuit arrangement according to claim 32, characterized in that the apparatus comprises an interface for a connectable computer and that the processor transmits the data, stored or storable in the program journal storage device, with a transmission program to the connected computer over a longer time span.

51. The circuit arrangement according to claim 32, characterized in that a generator is provided in the apparatus and, under the control of the process control equipment, effects the search run through all reception ranges continuously or discontinuously or at certain times or in dependence on the operative switching of the apparatus (stand-by) full operation switching-on/switching-off and that the thereby received program data are evaluated and entered into the program journal storage device, or the data entered there are overwritten, or already stored data are not taken over.

52. The circuit arrangement according to claim 32, further comprising a display switching frame circuit for opening a frame display superposing the program journal onto a displayed television picture of a currently received transmission.

53. The circuit arrangement according to claim 32, characterized in that a change-over switch, which causes the switching-over of the operation of the receiver circuit to channel selection or to program selection, is provided in the operating field.

54. The circuit arrangement according to claim 32, characterized in that the program journal storage device is an erasable read/write memory storage (RAM, EEPROM).

55. The circuit arrangement according to claim 54, characterized in that the read/write memory storage is an exchangeable memory storage which is insertable into the apparatus.

56. The circuit arrangement according to claim 55, characterized in that the exchangeable memory storage is a chip card with processor and storage device.

57. A method for setting-up an electronic program journal for television and/or sound radio programs in an apparatus for receiving television and/or sound radio from different transmitting institutions, comprising the following steps:

emitting program information as program data in video text (television text) program survey pages of the own transmitting institution and/or other transmitting institutions or feed these into cable networks and/or send program information as preliminary information to sound radio transmission stations or feed these into cable networks;

tuning a receiver circuit of the apparatus for reception;

decoding the received program data of the video text (television text) pages or the preliminary program information received with the sound radio signals by a decoder;

listing the received program data in a table;

storing the table in a program journal storage device;

indicating the table on a display;

evaluating at least one received identification characterizing the respective program;

taking the received identification up in the list in association with the program data;

sorting all received program data according to certain preset filing criteria by a processor circuit with an inscribed program according to a preset ordering algorithm;

storing the sorted data in the program journal storage device;

selectively tuning the receiving apparatus to the corresponding reception characteristics of a transmitted signal;

automatically associating data of the reception characteristics with the signal transmitted by the transmitter, as are necessary for a tuning of the receiver circuit to the signal carrying the program, with the program data depending on the selectively performed tuning;

storing the associated data in the program journal storage device;

calling up the stored program data out of the program journal storage device by actuation of a call-up device and presenting the stored program data on a display page by page according to preset sorting criteria; and selecting a line of the representation of the data for the tuning of the apparatus to a transmitter, for which the associated data of the reception characteristics are led to the tuning circuit of the receiver circuit.

58. The method according to claim 57 further comprising the following steps:

checking information pages emitted by a transmitter relative to contained program information data;

transferring the program data indicated in the program information data into video text pages, where the program information data or tables are ascertainable;

inserting the program data, which have not yet been entered into storage, according to an ordering algorithm into the video text pages; and, eliminating the program data previously entered into storage;

examining program information pages in case of sound radio transmissions of other receivable signals from transmitters in a like manner by selective tuning;

ordering the program data transferred to the video text pages;

likewise storing the transferred and ordered program data in the program journal storage device, wherein a batch-type capturing of the program data takes place over a certain time span by reference to transmission date stamps furnished with the program data.

* * * * *